United States Patent
Chen et al.

(10) Patent No.: US 11,834,061 B2
(45) Date of Patent: Dec. 5, 2023

(54) DRIVER ASSISTANCE DEVICE AND DRIVER ASSISTANCE METHOD

(71) Applicant: TOYOTA JIDOSHA KABUSHIKI KAISHA, Toyota (JP)

(72) Inventors: Xi Chen, Nagoya (JP); Kohei Morotomi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 17/034,461

(22) Filed: Sep. 28, 2020

(65) Prior Publication Data

US 2021/0101610 A1 Apr. 8, 2021

(30) Foreign Application Priority Data

Oct. 3, 2019 (JP) ................ 2019-182638

(51) Int. Cl.
*B60W 50/14* (2020.01)
*B60W 50/08* (2020.01)

(52) U.S. Cl.
CPC .......... *B60W 50/14* (2013.01); *B60W 50/082* (2013.01); *B60W 2050/143* (2013.01); *B60W 2050/146* (2013.01); *B60W 2510/18* (2013.01); *B60W 2520/12* (2013.01); *B60W 2710/18* (2013.01)

(58) Field of Classification Search
CPC ............... B60W 50/14; B60W 50/082; B60W 2050/143; B60W 2050/146; B60W 2510/18; B60W 2520/12; B60W 2710/18; B60W 2540/10; B60W 2540/12; B60W 2720/106; B60W 2520/10; B60W 2540/16; B60K 2370/157; B60K 2370/162; B60K 2370/178; B60K 35/00; B60K 28/00; B60K 28/14; B60K 26/02; B60K 2370/152; B60K 2370/1575; F02D 29/00; F02D 29/02; F02D 41/22; F02D 2041/228; F02D 2200/602; B60T 7/04
See application file for complete search history.

(56) References Cited

U.S. PATENT DOCUMENTS

| | | | |
|---|---|---|---|
| 5,797,467 | A | 8/1998 | Watanabe |
| 6,655,199 | B1 | 12/2003 | Smith |
| 9,105,190 | B2 | 8/2015 | Akiyama |
| 9,393,960 | B2 | 7/2016 | Kodaira |
| 9,405,727 | B2 | 8/2016 | Nagata |

(Continued)

FOREIGN PATENT DOCUMENTS

| | | | |
|---|---|---|---|
| CN | 108068621 A | 5/2018 | |
| CN | 106476813 B | 4/2019 | |

(Continued)

*Primary Examiner* — Jeff A Burke
*Assistant Examiner* — Madison B Emmett
(74) *Attorney, Agent, or Firm* — Sughrue Mion, PLLC

(57) ABSTRACT

A driver assistance device includes a one or more processors. The one or more processors is configured to determine whether a pedal misapplication determination condition is satisfied, and output, when the one or more processors determines that the pedal misapplication determination condition is satisfied, at least one of a warning display and warning audio directly instructing a driver to release the pedal that is depressed at a point in time of outputting.

7 Claims, 8 Drawing Sheets

(56) References Cited

U.S. PATENT DOCUMENTS

| | | |
|---|---|---|
| 9,483,945 B2 | 11/2016 | Okita et al. |
| 9,669,760 B2 | 6/2017 | Hanita et al. |
| 9,873,412 B2 | 1/2018 | Moriizumi |
| 9,898,929 B2 | 2/2018 | Harada et al. |
| 9,965,955 B2 | 5/2018 | Fujishiro |
| 10,228,698 B2 | 3/2019 | Mimura et al. |
| 10,793,147 B2 | 10/2020 | Kaminade et al. |
| 10,946,830 B2 | 3/2021 | Sawai et al. |
| 11,175,673 B2 | 11/2021 | Eshima |
| 2007/0142169 A1* | 6/2007 | Marcil .................. B60K 28/06 477/107 |
| 2011/0291859 A1 | 12/2011 | Kreis et al. |
| 2012/0191313 A1* | 7/2012 | Miyahara ............ B60W 50/087 701/70 |
| 2012/0209488 A1* | 8/2012 | Nagaya ................ B60W 10/06 701/70 |
| 2012/0221209 A1* | 8/2012 | Tatsukawa .......... B60W 10/184 701/42 |
| 2015/0274179 A1* | 10/2015 | Inoue ........................ B60T 7/12 701/70 |
| 2018/0134262 A1 | 5/2018 | Kurahashi et al. |
| 2018/0326998 A1 | 11/2018 | Aoi et al. |
| 2018/0345989 A1* | 12/2018 | Hashimoto ......... B60W 10/184 |
| 2018/0345991 A1 | 12/2018 | Mimura et al. |
| 2019/0039624 A1 | 2/2019 | Ike et al. |
| 2020/0101948 A1* | 4/2020 | Suzuki .................... B60T 17/22 |

FOREIGN PATENT DOCUMENTS

| | | |
|---|---|---|
| DE | 10 2010 021 558 A1 | 12/2011 |
| JP | 2003-254111 A | 9/2003 |
| JP | 4172185 B2 | 10/2008 |
| JP | 2009-57027 A | 3/2009 |
| JP | 2012-92695 A | 5/2012 |
| JP | 2012-207974 A | 10/2012 |
| JP | 2015-625 A | 1/2015 |
| JP | 2016-13807 A | 1/2016 |
| JP | 2018188029 A | 11/2018 |
| JP | 2018-203011 A | 12/2018 |
| JP | 6552472 B2 | 7/2019 |
| WO | 95/31349 A1 | 11/1995 |
| WO | 2012/131466 A1 | 10/2012 |

* cited by examiner

RELATED ART

DRIVER ASSISTANCE DEVICE AND DRIVER ASSISTANCE METHOD

INCORPORATION BY REFERENCE

The disclosure of Japanese Patent Application No. 2019-182638 filed on Oct. 3, 2019 including the specification, drawings and abstract is incorporated herein by reference in its entirety.

BACKGROUND

1. Technical Field

The disclosure relates to a driver assistance device and a driver assistance method.

2. Description of Related Art

There is known technology that suppresses a vehicle from sudden starting due to a pedal misapplication operation, which is an operation in which the driver erroneously depresses the accelerator pedal while intending to depress the brake pedal. For example, a vehicle driving control device proposed in Japanese Unexamined Patent Application Publication No. 2003-254111 (JP 2003-254111 A) detects a pedal misapplication operation by the driver, and restricts driving force of the vehicle. Accordingly, sudden starting of the vehicle is suppressed.

This vehicle driving control device starts restriction of driving force of the vehicle upon detecting a pedal misapplication operation by the driver, and operates a warning buzzer to attract the driver's attention.

SUMMARY

However, attracting attention by a warning buzzer may not be able to guide the driver to perform appropriate pedal operations. For example, there are cases where sudden starting of the vehicle occurs due to a pedal misapplication operation, but the driver keeps the accelerator pedal depressed.

There are also known devices that display an instruction to the driver on a display to depress the brake pedal such as illustrated in FIG. 9, when a pedal misapplication operation has been detected, for example. This device displays a text message m "The accelerator is depressed. Depress the brake." along with displaying an illustration i instructing depressing the brake pedal.

In a case of performing a pedal misapplication operation, the driver thinks he/she is depressing the brake pedal. On the other hand, the above illustration i instructs the driver to depress the brake pedal. The illustration i also represents a state where the foot of the driver is on the brake pedal. The driver is not in comprehension of the current situation, and accordingly display of the above illustration i does not readily communicate to the driver that he/she has erroneously depressed the accelerator pedal. Also, although the message m is displayed along with the illustration i, it takes a considerable amount of time for the driver to read the text of the message m and comprehend that he/she is performing a pedal misapplication operation.

What is important when a pedal misapplication operation has been performed is to cause the driver to lift his/her foot up from the accelerator pedal and decelerate the vehicle at an early stage. In comparison with this, the above display instructs the driver to depress the brake pedal, and accordingly it is difficult for the driver to recognize the fact that he/she is erroneously depressing on the accelerator pedal. As a result, the driver may not be able to decelerate the vehicle at an early stage when a pedal misapplication operation has been performed.

The disclosure provides a technology that guides the driver to perform operations to decelerate the vehicle at an early stage when a pedal misapplication operation has been performed.

A first aspect of the disclosure relates to a driver assistance device. The driver assistance device includes one or more processors. The one or more processors are configured to determine whether a pedal misapplication determination condition is satisfied, and output, when the one or more processors determine that the pedal misapplication determination condition is satisfied, at least one of a warning display and warning audio directly instructing a driver to release a pedal that is depressed at a point in time of outputting.

A second aspect of the disclosure relates to a driver assistance method executed by one or more processors. The driver assistance method includes determining whether a pedal misapplication determination condition is satisfied, and outputting, when the processor determines that the pedal misapplication determination condition is satisfied, at least one of a warning display and warning audio directly instructing the driver to release a pedal that is depressed at a point in time of outputting.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A driver assistance device according to an embodiment of the disclosure will be described below with reference to the drawings.

Figure 1:
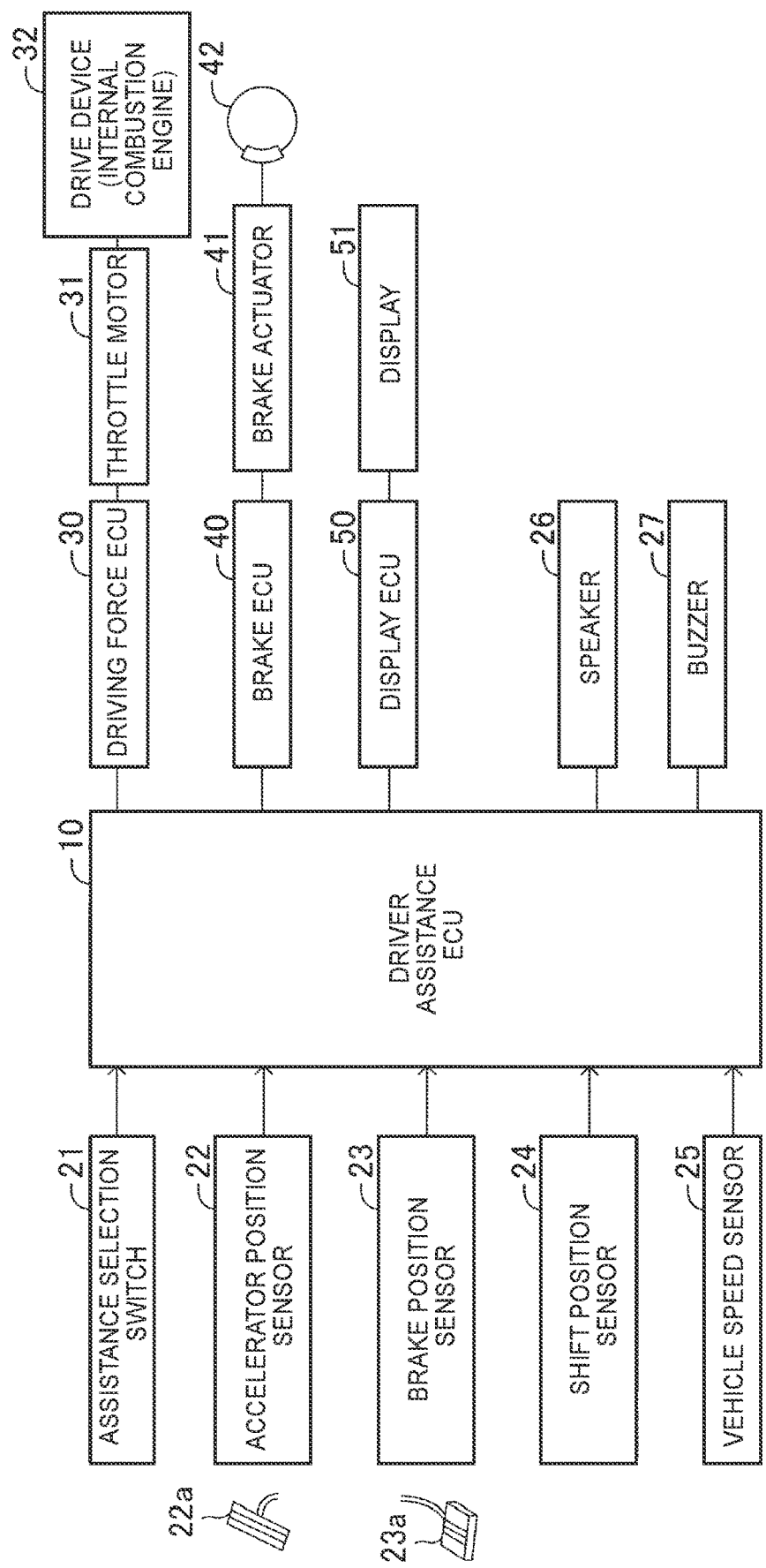
FIG. 1 is a schematic configuration diagram according to a driver assistance device according to an embodiment of the disclosure.

The driver assistance device according to the embodiment of the disclosure is applied to a vehicle, and is provided with a driver assistance electronic control unit (ECU) 10, a driving force ECU 30, a brake ECU 40, and a display ECU 50, as illustrated in FIG. 1.

These ECUs are provided with a microcomputer as a principal part, and are connected via a controller area network (CAN) that is omitted from illustration, so as to be capable of mutually transmitting and receiving information. In the present specification, a microcomputer includes a central processing unit (CPU), read-only memory (ROM), random access memory (RAM), nonvolatile memory, an interface (I/F), and so forth. The CPU is arranged to realize various types of functions by executing instructions (programs, routines) stored in the ROM. Some or all of these ECUs may be integrated into a single ECU.

The driver assistance ECU 10 is a control device that is central to performing driver assistance for the driver, and implements later-described pedal misapplication sudden-start suppression assistance. When this pedal misapplication sudden-start suppression assistance is implemented, pedal operations by the driver are monitored, and in a case where determination is made that a pedal misapplication operation is performed, attention of the driver is attracted (a warning is issued). At the same time as attracting attention, driving force of the vehicle is restricted and sudden acceleration of the vehicle is suppressed. Note that the term "pedal misapplication operation" refers to an operation where the driver erroneously depresses the accelerator pedal while intending to depress the brake pedal.

Connected to the driver assistance ECU 10 are an assistance selection switch 21, an accelerator position sensor 22, a brake position sensor 23, a shift position sensor 24, a vehicle speed sensor 25, a speaker 26, and a buzzer 27. Note that the sensors may be connected to an ECU other than the driver assistance ECU 10. In this case, the driver assistance ECU 10 receives detection signals of the sensors from the ECU to which the sensors are connected, via the CAN.

The assistance selection switch 21 is a switch for the driver to select whether to permit or not permit implementation of pedal misapplication sudden-start suppression assistance. An operation of turning the assistance selection switch 21 on selects a mode "permitting implementation of pedal misapplication sudden-start suppression assistance", and an operation of turning the assistance selection switch 21 off selects a mode "forbidding implementation of pedal misapplication sudden-start suppression assistance". Each time a mode selection operation is performed at the assistance selection switch 21, the driver assistance ECU 10 updates its memory to that mode, and decides permission of implementation or forbidding of implementation regarding pedal misapplication sudden-start suppression assistance in accordance with the newest mode to which the memory has been updated.

The accelerator position sensor 22 detects an operation amount (depressing amount) of an accelerator pedal 22*a* of the vehicle, and outputs signals representing the operation amount of the accelerator pedal. Hereinafter, the operation amount of the accelerator pedal detected by the accelerator position sensor 22 will be referred to as "accelerator operation amount", and an operation of depressing the accelerator pedal 22*a* will be referred to as "accelerator operation". The accelerator operation amount is "0" when the driver is not performing an accelerator operation (e.g., when the foot of the driver is situated away from the accelerator pedal 22*a*), and increases proportionally with the amount of depressing the accelerator pedal 22*a*.

The brake position sensor 23 detects the operation amount (depressing amount) of a brake pedal 23*a* of the vehicle, and outputs signals representing the operation amount of the brake pedal. Hereinafter, the operation amount of the brake pedal will be referred to as "brake operation amount", and operation of depressing the brake pedal 23*a* will be referred to as "brake operation". The brake operation amount is "0" when the driver is not performing a brake operation (e.g., when the foot of the driver is situated away from the brake pedal 23*a*), and increases proportionally with the amount of depressing of the brake pedal 23*a*. Note that in the present embodiment, the brake position sensor 23 is used to determine whether a brake operation has been performed. Accordingly, a brake switch that outputs on/off signals, in accordance with whether brake pedal operations are performed, may be used instead of the brake position sensor 23.

The shift position sensor 24 detects the position of a shift lever (omitted from illustration) operated by the driver (hereinafter referred to as "shift position"), and outputs signals representing the detected shift position. Shift positions include a park range "P" position, a drive range "D" position, a reverse range "R" position (reverse position R), a neutral range "N" position, and so forth.

The vehicle speed sensor 25 detects vehicle speed that is the traveling speed of the vehicle, and outputs signals representing the vehicle speed. Note that a configuration may be made where signals output by wheel speed sensors (omitted from illustration) for the four wheels are input to the driver assistance ECU 10, which computes the vehicle speed based on the wheel speed of the four wheels detected by the wheel speed sensors, instead of the vehicle speed sensor 25.

In a case of having received audio signals transmitted from the driver assistance ECU 10, the speaker 26 outputs an audio message in accordance with the audio signals.

In a case of having received a warning sound output command transmitted from the driver assistance ECU 10, the buzzer 27 emits a warning sound as long as the warning sound output command is being received.

Note that a configuration may be made where both the audio message and warning sound are output from the speaker 26. In this case, the buzzer 27 can be omitted.

The driving force ECU 30 is connected to a throttle motor 31. The throttle motor 31 receives valve adjustment signals from the driving force ECU 30, and adjusts an opening angle of a throttle valve (omitted from illustration) provided in a drive device 32 (internal combustion engine) based on the received valve adjustment signals. The driving force ECU 30 sets a driver-requested driving force based on the accelerator operation amount sensed by the accelerator position sensor 22, and controls actions of the throttle motor 31 so that the driving force of the vehicle comes closer to the driver-requested driving force.

In a case of having received a driving force restriction command transmitted from the driver assistance ECU 10, the driving force ECU 30 controls actions of the throttle motor 31 so as to restrict driving force generated by the drive device 32 as long as the driving force restriction command is being received.

Note that when the vehicle is an electric automobile, the drive device 32 is a driving motor, and the driving force ECU 30 controls actions of the driving motor. Also, when the vehicle is a hybrid vehicle, the drive device 32 is an engine and driving motor, and the driving force ECU 30 controls actions of the throttle motor 31 and driving motor.

The brake ECU 40 is connected to a brake actuator 41. The brake actuator 41 adjusts the hydraulic pressure of a hydraulic friction brake mechanism 42 provided to wheels at the front and rear, and right and left, and generates friction braking force in accordance with the hydraulic pressure. The brake ECU 40 sets a driver-requested deceleration based on the brake operation amount sensed by the brake position sensor 23, and controls actions of the brake actuator 41 so that the vehicle decelerates at the driver-requested deceleration. Also, in a case of having received a braking command transmitted from the driver assistance ECU 10, the brake ECU 40 controls actions of the brake actuator 41 so that the vehicle decelerates at the requested deceleration, which is information contained in the braking command.

The display ECU 50 is connected to a display 51. This display 51 is a head-up display where various types of information assisting the driver to drive are displayed at a partial region (display region) of the windshield of the vehicle. The display ECU 50 is a display driver that controls displaying on the display 51. In a case of having received a pedal misapplication attention-attracting display command transmitted from the driver assistance ECU 10, the display ECU 50 causes the attention-attracting display to be displayed on the display 51 as long as the pedal misapplication attention-attracting display command is being received. This attention-attracting display will be described later.

Pedal Misapplication Sudden-Start Suppression Assistance

Next, an overview of pedal misapplication sudden-start suppression assistance will be described.

When a pedal misapplication operation is performed, vehicle behavior that differs from that intended by the driver (e.g., sudden acceleration of the vehicle) occurs. Accordingly, the driver assistance ECU 10 determines whether a pedal misapplication operation has occurred. The driver assistance ECU 10 stores pedal misapplication determination conditions that have been set beforehand, and determines that a pedal misapplication operation has occurred when the pedal misapplication determination conditions are satisfied.

When a pedal misapplication operation has been detected (more accurately, when determination has been made that a pedal misapplication operation has occurred), the driver assistance ECU 10 sets the driving force of the vehicle, which is generated at the drive device 32, to be smaller than normal operations (a case where no pedal misapplication operation has been detected). Accordingly, vehicle behavior different from that intended by the driver can be suppressed.

At the same time, the driver assistance ECU 10 attracts the attention of the driver (gives a warning). This attraction of attention is performed in a form of instructing the driver to release the pedal that he/she is currently depressing. Attracting attention includes an attention-attracting display on the display 51, sounding of a warning sound by the buzzer 27, and outputting an attention-attracting audio message from the speaker 26. This attraction of attention causes the driver to recognize that he/she has been erroneously depressing the accelerator pedal 22a, and shift from depressing the accelerator pedal 22a to depressing the brake pedal 23a. Thus, the vehicle can be made to decelerate.

Determination of Pedal Misapplication Operation

A technique for determining (estimating) whether a pedal misapplication operation has occurred will be described here.

When a driver wants to move a parked vehicle forward, the driver depresses the brake pedal 23a and changes the shift lever position from the park range "P" position to the drive range "D" position. Thereafter, the driver depresses the accelerator pedal 22a over a relatively long stroke and relatively quickly.

On the other hand, when the driver wants to move a parked vehicle backward, the driver depresses the brake pedal 23a and changes the shift lever position from the park range "P" position to the reverse range "R" position. In this case, the driver normally operates the brake pedal 23a so that the vehicle slowly moves backwards (creeps), or quits depressing the brake pedal 23a and thereafter depresses the accelerator pedal 22a slightly. In other words, in a case of backing up the vehicle, the driver will not depress the accelerator pedal 22a over a relatively long stroke nor relatively quickly. To put it the other way around, when the accelerator pedal 22a is depressed over a relatively long stroke and relatively quickly, there is a high probability that the operation performed as to the accelerator pedal 22a was an erroneous operation.

Accordingly, the driver assistance ECU 10 determines that a pedal misapplication operation has occurred when all of the following conditions 1 through 3 are satisfied.

1. The shift lever position is reverse range "R".
2. The accelerator operation amount is no less than a pedal misapplication determination operation amount.
3. The accelerator operation speed is no less than a pedal misapplication determination operation speed.

The above conditions 1 through 3 are pedal misapplication determination conditions according to the present embodiment. The pedal misapplication determination conditions are satisfied when there is possibility that the pedal misapplication operation has occurred and are conditions for estimating whether the pedal misapplication operation has occurred. The pedal misapplication determination operation amount is a threshold value of accelerator operation amount for determination of pedal misapplication, set beforehand. The pedal misapplication determination operation speed is a threshold value of accelerator operation speed for determination of pedal misapplication, set beforehand. The accelerator operation speed represents the amount of change in the accelerator operation amount per unit time.

Suppression of Driving Force

When a pedal misapplication operation has been detected, the driving force of the vehicle is reduced as compared to normal operations. Normally, the driving force ECU 30 sets a driver-requested driving force (target driving force) corresponding to the accelerator operation amount, based on a driver-requested driving force map, and controls actions of the throttle motor 31 so that the driving force of the vehicle generated at the drive device 32 (actual driving force) comes closer to the driver-requested driving force. The driver-requested driving force map is data where the accelerator operation amount and driver-requested driving force have been correlated, so that the greater the accelerator operation amount is, the greater the driver-requested driving force is.

Figure 2:
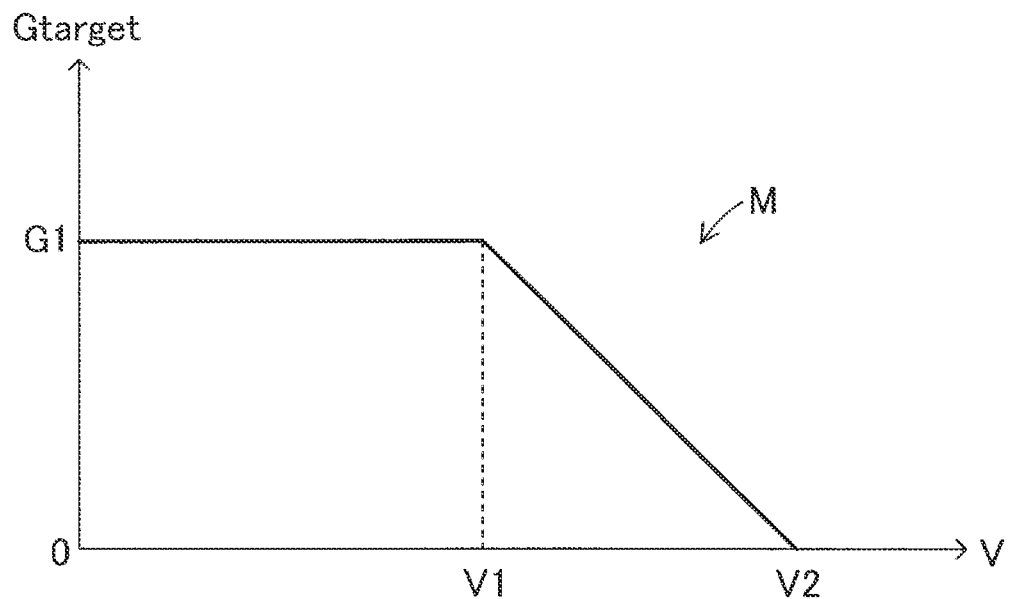
FIG. 2 is a graph showing a target restriction acceleration map.

On the other hand, when a pedal misapplication operation has been detected, the driver assistance ECU 10 transmits a driving force restriction command to the driving force ECU 30. In this case the driving force ECU 30 sets a target driving force as follows. The driving force ECU 30 stores a target restriction acceleration map M illustrated in FIG. 2. The target restriction acceleration map M is data correlating vehicle speed V at the current point in time that is detected by the vehicle speed sensor 25, and target restriction acceleration Gtarget. The target restriction acceleration map M has characteristics where, in a range from vehicle speed V of zero to a first vehicle speed V1, the target restriction acceleration Gtarget is set to a constant value G1, and in a low-speed range where the vehicle speed V is greater than first vehicle speed V1 and no more than a second vehicle speed V2, the target restriction acceleration Gtarget is linearly decreased from the value G1 to zero in accordance with increase in the vehicle speed V.

Upon receiving the driving force restriction control start command, the driving force ECU 30 uses this target restriction acceleration map M to set the target driving force as follows.

The driving force ECU 30 computes a target restriction driving force in accordance with a deviation (Gtarget−G) between the target restriction acceleration Gtarget corresponding to the vehicle speed V at the current point in time set in the target restriction acceleration map M, and acceleration G of the vehicle at the current point in time (also referred to as actual acceleration G) that is detected by an acceleration sensor (omitted from illustration). This target restriction driving force is computed by feedback control (e.g., proportional (P) control, proportional-integral (PI) control, proportional-integral-derivative (PID) control, or the like), where the deviation (Gtarget−G) converges to zero. A target restriction acceleration Gtarget is set in the target restriction acceleration map M such that the vehicle does not suddenly accelerate. Accordingly, the target restriction driving force does not become a large value even if the driver performs a long-stroke operation of the accelerator pedal 22*a*.

The driving force ECU 30 compares the driver-requested driving force set based on the driver-requested driving force map and the above-described target restriction driving force, selects the smaller driving force, and sets the value of that driving force as the final value of the target driving force. Accordingly, the target driving force is set to a value where the upper limit value has been restricted to the target restriction driving force, as to the driver-requested driving force. The driving force ECU 30 controls actions of the throttle motor 31 so that the driving force of the vehicle generated at the drive device 32 (actual driving force) comes closer to the target driving force restricted as described above.

Accordingly, when a pedal misapplication operation is detected, the driving force of the vehicle that the drive device 32 generates is reduced as compared to normal operations, by upper limit value restriction of the target driving force. Thus, undesired behavior of the vehicle (e.g., sudden backward acceleration) can be suppressed. There are cases where upper limit value restriction is implemented in normal operations as well, but the upper limit value in a situation where a pedal misapplication operation is detected is set to be smaller than the upper limit value in normal operations. Control where the target driving force (driving force of the vehicle generated at the drive device 32) is thus restricted as compared to normal operations will be referred to as "driving force restriction control".

Attracting Attention

In a case of having detected a pedal misapplication operation, the driver assistance ECU 10 transmits a pedal misapplication attention-attracting display command to the display ECU 50, transmits pedal misapplication attention-attracting audio signals to the speaker 26, and transmits a warning sound output command to the buzzer 27.

Figure 3:
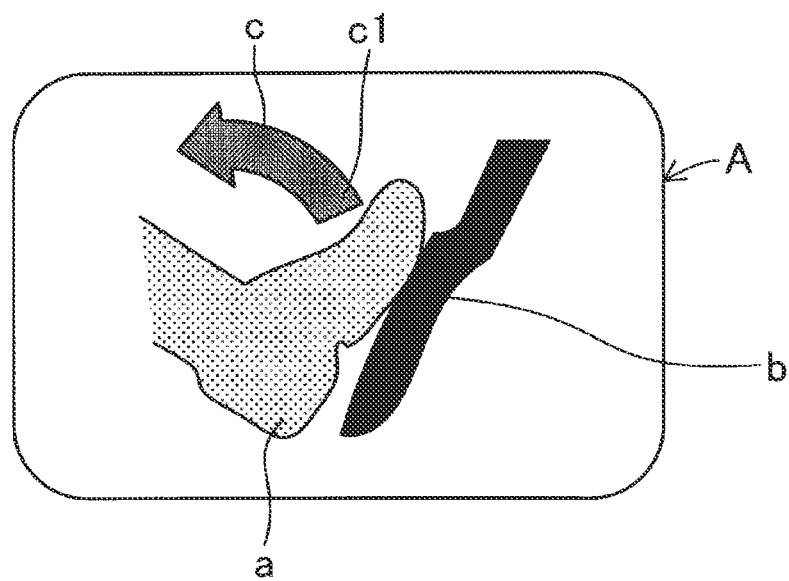
FIG. 3 is a frontal view of an attention-attracting illustration displayed on a display.

Upon receiving the pedal misapplication attention-attracting display command, the display ECU 50 displays an attention-attracting illustration A, illustrated in FIG. 3, on the display screen (windshield) of the display 51 (head-up display). The attention-attracting illustration A is an illustration where an arrow c has been added to an illustration where a foot a in a state of depressing a pedal b is viewed from the lateral side of the vehicle. This arrow c is an arrow pointing in a direction of distancing the foot a away from the pedal b, with a base portion c1 thereof being situated at the tip side position of the foot a.

The foot a, the pedal b, and the arrow c preferably are displayed in colors that are different from each other, but there is no particular need to do so, and the color combination can be optionally set.

The attention-attracting illustration A may also be a lit display (continuous display) or a blinking display (intermittent display).

Upon receiving the pedal misapplication attention-attracting audio signals, the speaker 26 outputs an audio message of "Accelerator is depressed. Release the pedal." This audio message is repeatedly output in the present embodiment, but does not necessarily need to be repeated, and may be output just once.

In a case of having received the warning sound output command, the buzzer 27 emits a warning sound (e.g., a sound "beep-beep-beep").

Pedal Misapplication Sudden-Start Suppression Assistance Control Routine

Figure 4:
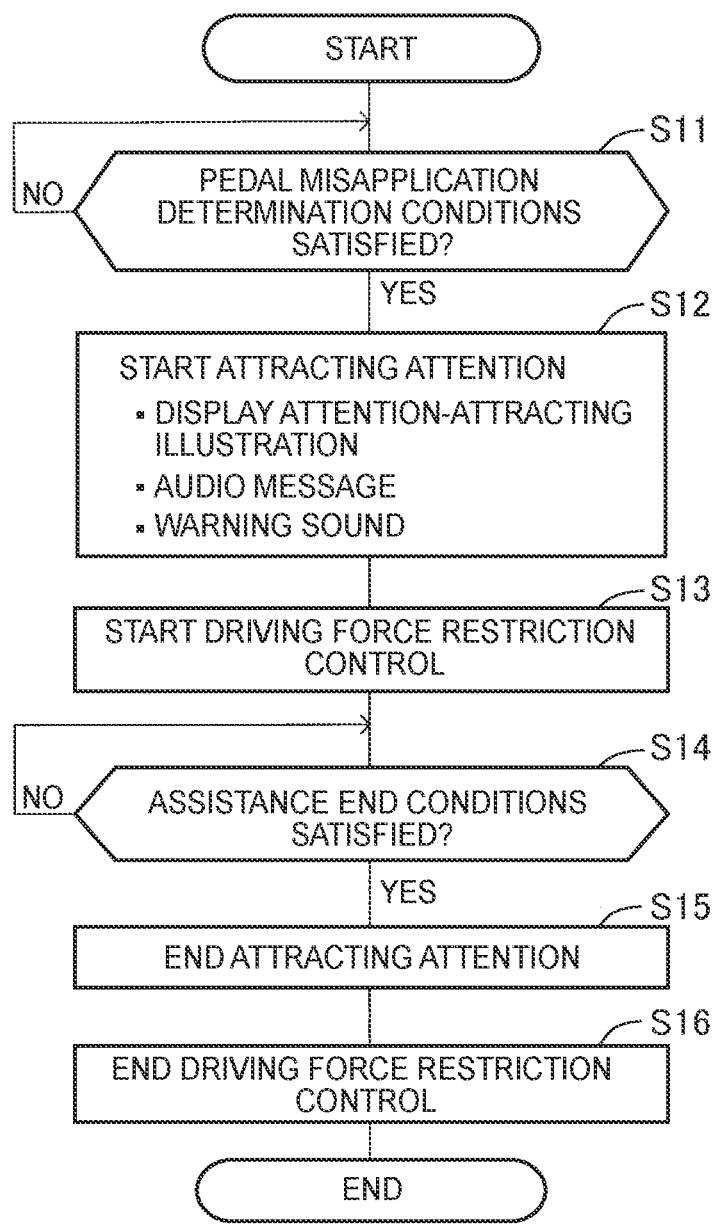
FIG. 4 is a flowchart showing a pedal misapplication sudden-start suppression assistance control routine.

Next, specific processing of pedal misapplication sudden-start suppression assistance will be described. FIG. 4 shows the pedal misapplication sudden-start suppression assistance control routine that the driver assistance ECU 10 implements. The driver assistance ECU 10 repeatedly implements the pedal misapplication sudden-start suppression assistance control routine when the mode "permitting implementation of pedal misapplication sudden-start suppression assistance" has been selected by an operation of turning the assistance selection switch 21 on.

When the pedal misapplication sudden-start suppression assistance control routine is started, in step S11 the driver assistance ECU 10 determines whether the pedal misapplication determination conditions have been satisfied. In this step S11, determination is made regarding whether all of the above-described conditions 1 through 3 have been satisfied.

The driver assistance ECU 10 repeatedly implements the determination processing in step S11, and at a timing of having determined that the pedal misapplication determination conditions have been satisfied (Yes in S11), advances the processing to step S12. In step S12, the driver assistance ECU 10 starts attention attracting. In this case, the driver assistance ECU 10 transmits the pedal misapplication attention-attracting display command to the display ECU 50, transmits the pedal misapplication attention-attracting audio signals to the speaker 26, and transmits the warning sound output command to the buzzer 27.

Accordingly, the attention-attracting illustration A is displayed on the display 51, the above-described audio message is output from the speaker 26, and the warning sound is emitted from the buzzer 27.

Next, in step S13, the driver assistance ECU 10 transmits a driving force restriction command to the driving force ECU 30, to start driving force restriction control. In this case, the driving force ECU 30 computes the target restriction driving force as described above, compares the driver-requested driving force and the target restriction driving force and sets the smaller driving force as the final value of the target driving force. The driving force ECU 30 controls the actions of the throttle motor 31 so that the driving force of the vehicle generated at the drive device 32 (actual driving force) comes closer to the target driving force.

Note that the processing of step S12 and the processing of step S13 are performed substantially simultaneously. Accordingly, the order of the processing of step S12 and the processing of step S13 may be interchanged.

Next, the driver assistance ECU 10 determines in step S14 whether assistance end conditions have been satisfied. The assistance end conditions are conditions to end the attention attracting and driving force restriction control, and are satisfied when, for example, the brake pedal 23a has been depressed, i.e., the brake operation amount has been detected at a value larger than zero. Alternatively, assistance end conditions may be satisfied when the driver releases the accelerator pedal 22a (removes his/her foot from the accelerator pedal 22a), and an accelerator operation amount of zero has been detected.

The driver assistance ECU 10 repeatedly implements the determination processing of step S14, and at a timing of having determined that assistance end conditions are satisfied (Yes in S14), advances the processing to step S15. The driver assistance ECU 10 ends the attention attracting in step S15. In this case, the driver assistance ECU 10 stops transmission of the pedal misapplication attention-attracting display command to the display ECU 50, stops transmission of the pedal misapplication attention-attracting audio signals to the speaker 26, and stops transmission of the warning sound output command to the buzzer 27. Thus, the display of the attention-attracting illustration A displayed on the windshield goes off, and output of the pedal misapplication attention-attracting audio message and the warning sound is stopped.

Next, in step S16, the driver assistance ECU 10 stops transmission of the driving force restriction command to the driving force ECU 30, to end the driving force restriction control.

Note that the processing of step S15 and the processing of step S16 are performed substantially simultaneously. Accordingly, the order of the processing of step S15 and the processing of step S16 may be interchanged.

Upon ending the driving force restriction control, the driver assistance ECU 10 temporarily ends the pedal misapplication sudden-start suppression assistance control routine, and after a predetermined short interval, resumes the pedal misapplication sudden-start suppression assistance control routine.

Figure 5:
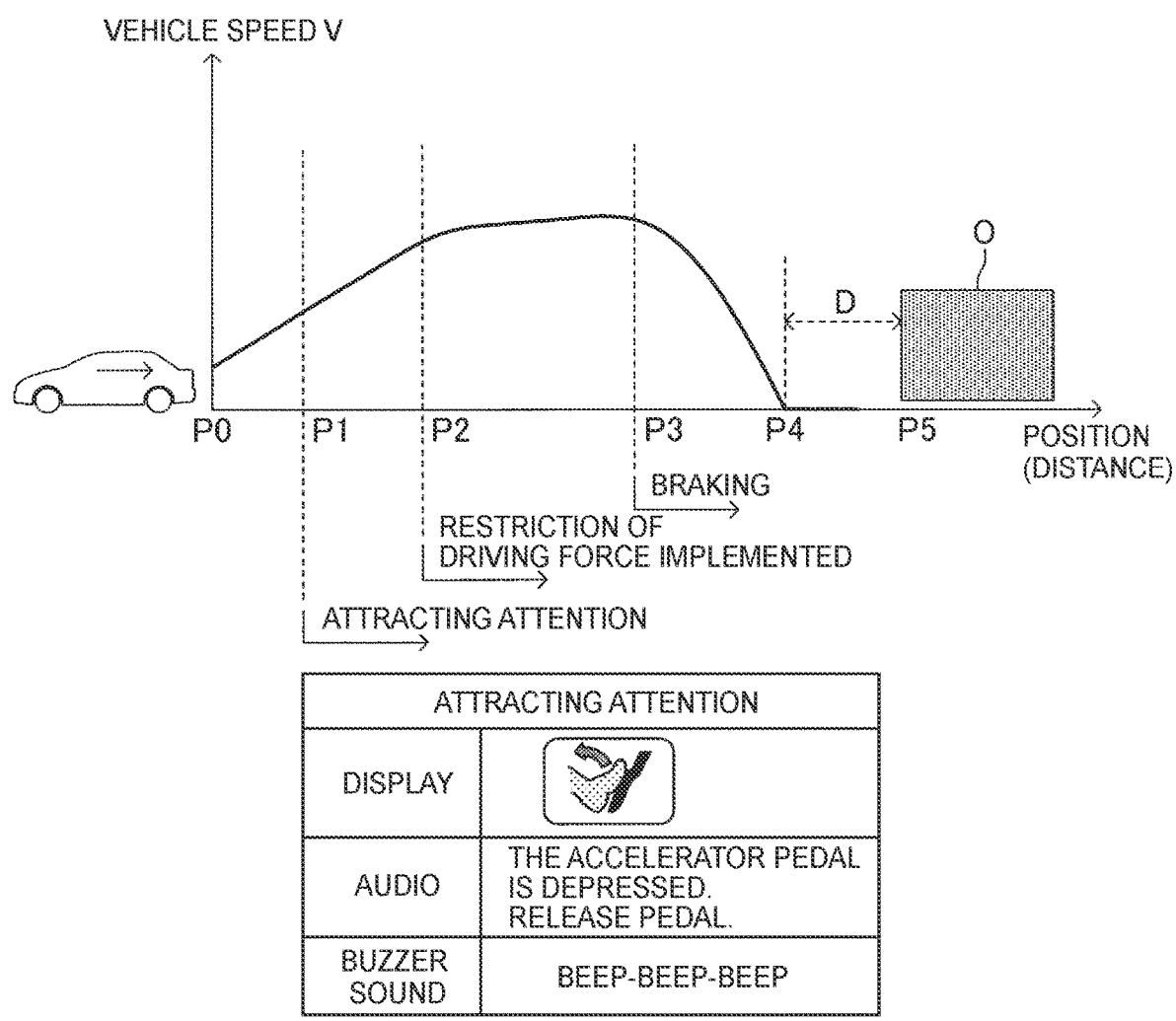
FIG. 5 is a graph showing transition of vehicle speed after a pedal misapplication operation has been performed.

FIG. 5 shows transition of the vehicle speed V after a pedal misapplication operation has been performed. A case will be considered in which, in a state where the shift lever position is set to the reverse range "R", for example, the driver intends to depress the brake pedal 23a but erroneously deeply depresses the accelerator pedal 22a. Upon the accelerator pedal 22a being deeply depressed by the driver at point P0, the vehicle speed V (absolute value) increases. At the point in time when the vehicle has backed up to point P1, the pedal misapplication determination conditions are satisfied, and accordingly attention attracting and driving force restriction control are started. At the point in time when the vehicle has backed up to point P2 while accelerating, the target restriction driving force becomes smaller than the driver-requested driving force, and driving force is restricted. From this point in time, increase in vehicle speed V is suppressed.

The driver recognizes the pedal misapplication through attraction of attention, removes his/her foot from the accelerator pedal 22a, and depresses the brake pedal 23a (point P3). Accordingly, the vehicle starts decelerating, and comes to a stop (point P4). In this example, there is an obstruction O at point P5. Accordingly, the vehicle can be stopped at a position short of the obstruction by a distance D.

In order to keep the vehicle from colliding with the obstruction, the amount of time required for the driver to switch pedals after having performed the pedal misapplication operation needs to be as short as possible. Accordingly, in the present embodiment, the attention-attracting illustration A (see FIG. 3) is displayed on the windshield (preferably around a position where the line of sight of the driver and the windshield intersect) as a pedal misapplication attention-attracting display, as described above. Also, the audio message "Accelerator is depressed. Release the pedal." is output from the speaker 26.

Figure 6:
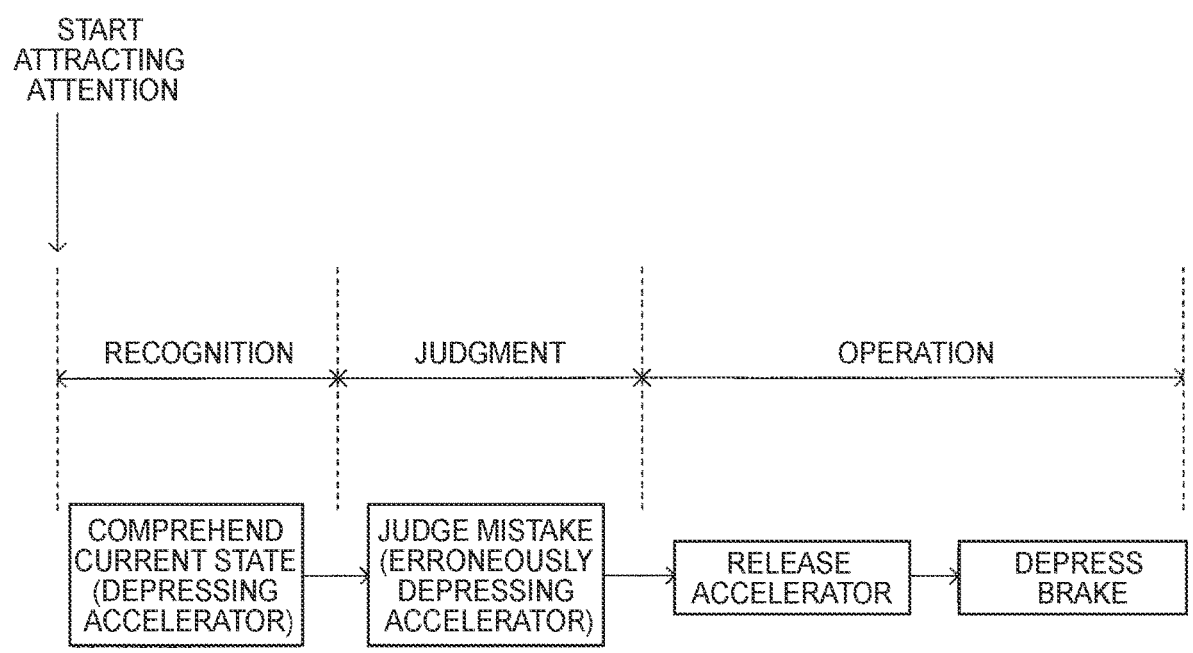
FIG. 6 is an explanatory diagram representing a process from a driver having performed a pedal misapplication operation to returning to correct pedal operations.

Now, the process from the driver performing a pedal misapplication operation up to returning to correct pedal operations will be described with reference to FIG. 6.

In order for the driver to return to correct pedal operations, the driver first needs to comprehend the current situation. That is to say, the driver needs to recognize the current state where he/she is depressing the accelerator pedal 22a. The process of comprehending this current state will be referred to as "recognition process".

Through this recognition process, the driver can judge that he/she is erroneously depressing the accelerator pedal 22a. The process from recognizing the current state up to this judgment being made will be referred to as "judgment process".

Having gone through the recognition process and the judgment process, the driver removes his/her foot from the accelerator pedal 22a, and depresses the brake pedal 23a. The process of performing this pedal switching will be referred to as "operation process".

In order to reduce the time necessary from the driver performing the pedal misapplication operation up to switching from depressing the accelerator pedal 22a to depressing the brake pedal 23a, the pre-operation processes made up of the recognition process and judgment process need to be reduced.

Accordingly, in the present embodiment, the driver is instructed to release the pedal that is depressed, by displaying the attention-attracting illustration A. Thus, the driver releases the pedal that he/she is depressing. In this case, the driver has thought that he/she is depressing the brake pedal 23a until immediately before, but can readily recognize the current situation that he/she is erroneously depressing the accelerator pedal 22a at an early stage, through the display of the attention-attracting illustration A. Also, the driver may start to a pedal releasing operation even without recognizing the current state, but even in this case, the current state can be readily recognized partway through the pedal releasing operation. Accordingly, the driver can switch from depressing the accelerator pedal 22a to depressing the brake pedal 23a at an early stage.

Although the driver can be guided to perform operations to decelerate the vehicle at an early stage by the attention-attracting illustration A alone, the audio message is output from the speaker 26 in the present embodiment, in addition to display of the attention-attracting illustration A. The audio message output first is "Accelerator is depressed." Accordingly, the driver can be made to recognize the current state that he/she is depressing the accelerator pedal 22a in an even more sure manner (recognition process). The driver can thus judge that he/she is performing erroneous pedal operations through not only the attention-attracting illustration A, but also through this audio message as well (judgment process).

Further, in the audio message, "Release the pedal." is output following "Accelerator is depressed." Accordingly, the driver is effectively guided to release the pedal that he/she is depressing through not only the attention-attracting illustration Abut also through the audio message as well. Thus, the driver can switch from depressing the accelerator pedal 22a to depressing the brake pedal 23a at an early stage.

In this way, according to the present embodiment, when a pedal misapplication operation has been performed, the driver can be guided to perform operations to decelerate the vehicle at an early stage. Accordingly, the probability of the vehicle colliding with an obstruction by the pedal misapplication operation can be reduced.

Also, the attention-attracting illustration A has the arrow c, pointing in the direction of distancing the foot a away from the pedal b added to the illustration of the foot a in a state of depressing the pedal b as viewed from the lateral side of the vehicle, and accordingly the driver can be made to intuitively recognize the direction in which his/her foot should be moved. Accordingly, the driver can be guided through this attention-attracting illustration A to quickly release the accelerator pedal 22a. The driver can also readily recognize that he/she has been erroneously depressing the accelerator pedal 22a from the instruction through this attention-attracting illustration A. Accordingly, the driver can recognize the situation at an early stage, and can perform correct pedal operations.

First Modification

Figure 7:
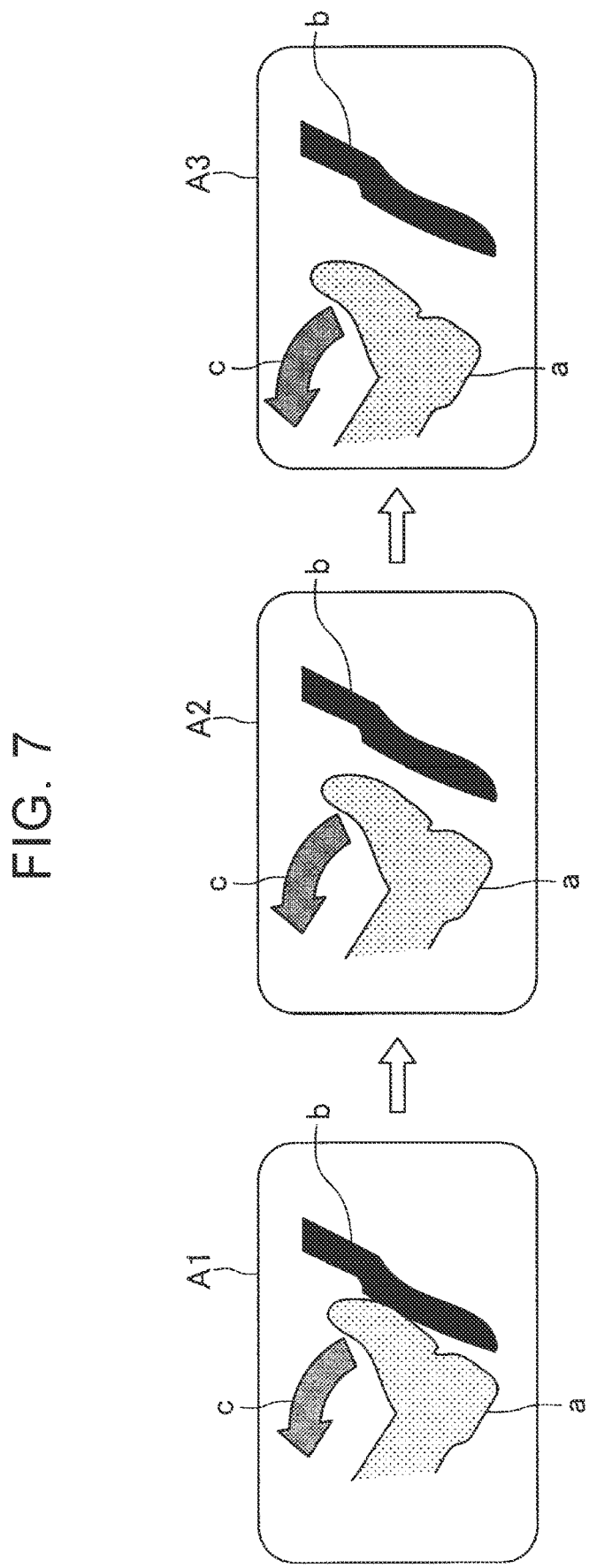
FIG. 7 is a frontal view of attention-attracting illustrations displayed on a display according to a first modification.

For example, the attention-attracting illustration A may be made by switching display of multiple illustrations. For example, the display ECU 50 stores a first illustration A1, a second illustration A2, and a third illustration A3, as illustrated in FIG. 7, and switches the display in the order of the first illustration A1, the second illustration A2, and the third illustration A3, along with the passage of time after pedal misapplication determination conditions are satisfied.

The first illustration A1 is the same as the attention-attracting illustration A (FIG. 3) according to the present embodiment. The second illustration A2 is laid out with the foot a being retracted as compared to the first illustration A1, and distanced from the pedal b. The third illustration A3 is laid out with the foot a being retracted even further as compared to the second illustration A2, and distanced farther from the pedal b. Accordingly, a display is made as if the foot a is moving away from the pedal b, by switching the display in the order of the first illustration A1, the second illustration A2, the third illustration A3.

Second Modification

Figure 8:
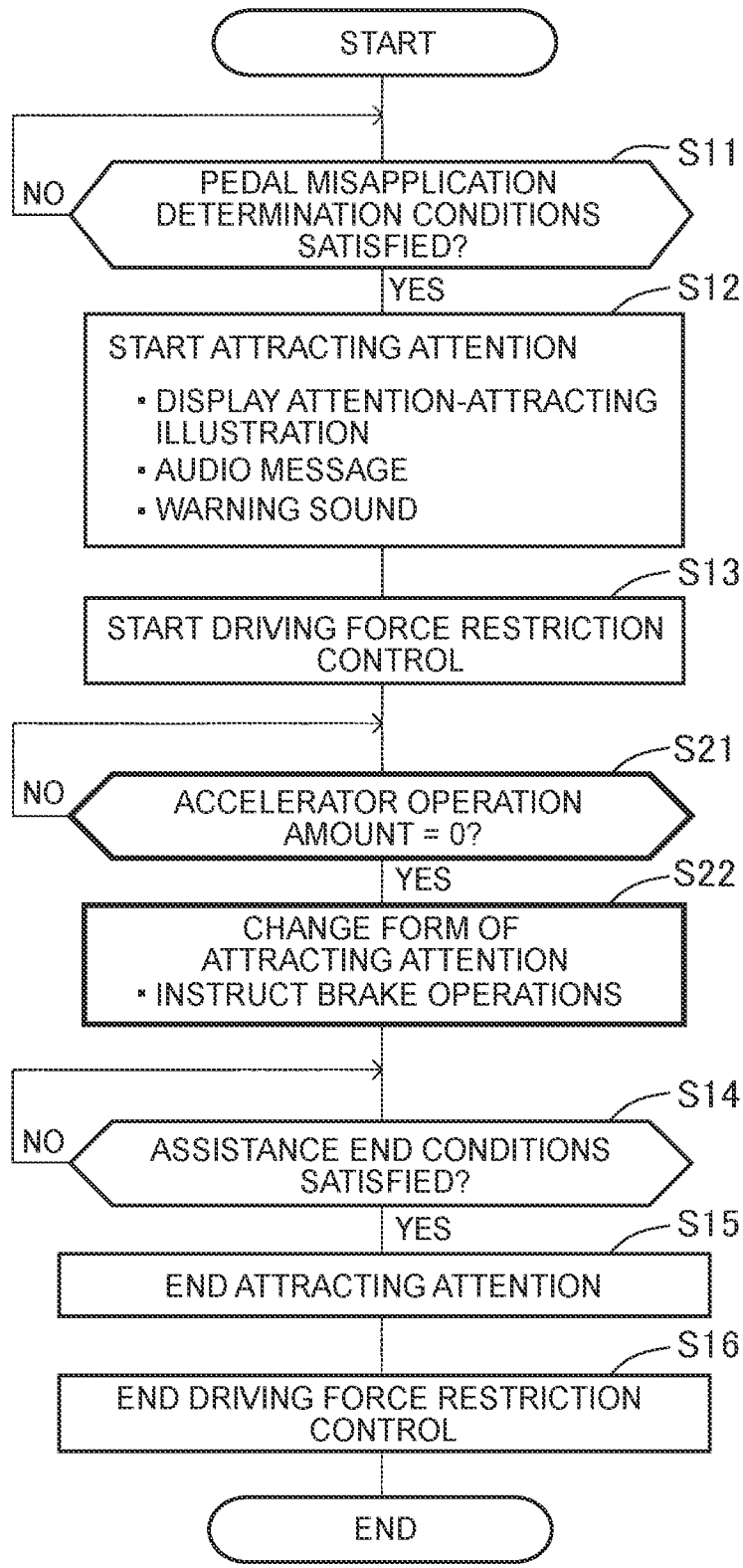
FIG. 8 is a flowchart showing a pedal misapplication sudden-start suppression assistance control routine according to a second modification.
Figure 9:
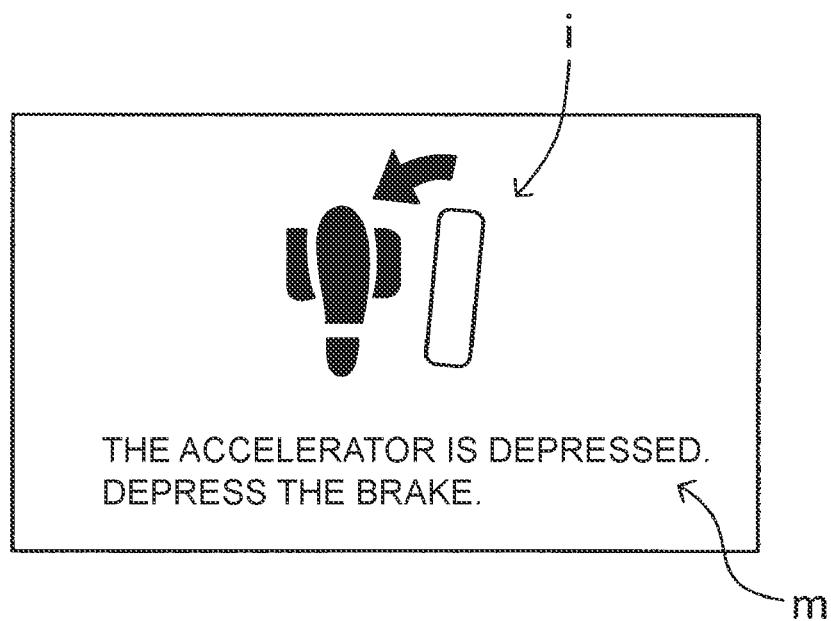
FIG. 9 is a frontal view of an attention-attracting illustration of a related art.

An arrangement may be made where, for example, at the point where release of the accelerator pedal 22a (accelerator operation amount=0) is detected after starting attraction of attention, additional attraction of attention is performed in a form of instructing to perform brake operations. For example, the driver assistance ECU 10 executes the pedal misapplication sudden-start suppression assistance control routine illustrated in FIG. 8. This pedal misapplication sudden-start suppression assistance control routine according to a second modification has processing of step S21 and step S22 added between step S13 and step S14 in the pedal misapplication sudden-start suppression assistance control routine according to the embodiment (FIG. 4), and other processing is the same as in the pedal misapplication sudden-start suppression assistance control routine according to the embodiment.

In step S21, the driver assistance ECU 10 reads in the accelerator operation amount that the accelerator position sensor 22 outputs, and determines whether the accelerator operation amount has reached 0. The driver assistance ECU 10 repeats this determination processing until the accelerator operation amount reaches 0. Upon detecting that the accelerator operation amount has reached 0, the driver assistance ECU 10 advances the processing to step S22.

The driver assistance ECU 10 changes the form of attraction of attention in step S22. For example, the form that had been carried out until then (a form of directly instructing to release the pedal that is depressed) is changed to a form of instructing to perform brake operations. In this case, the driver assistance ECU 10 transmits a braking display command to the display ECU 50 instead of the pedal misapplication attention-attracting display command that had been transmitted so far, and transmits braking instruction audio signals to the speaker 26 instead of the pedal misapplication attention-attracting audio signals that had been transmitted so far. The driver assistance ECU 10 continues to transmit the warning sound output command to the buzzer 27.

Upon receiving the braking display command, the display ECU 50 displays the text "BRAKE!!" for example, on the display 51 instead of the attention-attracting illustration A. Also, upon receiving the braking instruction audio signals, the speaker 26 outputs an audio message of "Depress the brake." for example.

Next, in step S14, the driver assistance ECU 10 determines whether assistance end conditions have been satisfied. In this case, the driver assistance ECU 10 determines that the assistance end conditions have been satisfied when the brake pedal 23a has been depressed, i.e., in a case of detecting that the brake operation amount is a value larger than zero.

According to this second modification, the driver can be guided to release the accelerator pedal 22a at an early stage in the same way as in the embodiment, and after having released the accelerator pedal 22a, the driver is directly instructed to perform brake operations. Accordingly, the driver can be guided to perform brake operations even more efficiently.

Although the driver assistance device has been described above by way of embodiment and modifications, the disclosure is not limited to the above embodiment, and various types of modifications can be made without departing from the scope of the disclosure.

For example, although description has been made in the present embodiment that it is determined that the pedal misapplication operation has occurred when all of the conditions 1 through 3 are satisfied, condition 1 may be excluded from the pedal misapplication operation conditions. That is, it may be determined that the pedal misapplication operation has occurred when the conditions 2 and 3 are satisfied.

For example, although description has been made in the present embodiment that the driver is instructed to release the pedal that he/she is depressing, using both the display of the attention-attracting illustration A and an audio message, this does not necessarily have to be followed. For example, the driver may be instructed to release the pedal that he/she is depressing, using just one of the display of the attention-attracting illustration A and an audio message.

Also, although the audio message according to the present embodiment is made up of a message to the effect that the accelerator pedal is depressed, and a message instructing to release the pedal that is depressed, an arrangement may be made where the audio message is only the message instructing to release the pedal that is depressed, for example.

Also, although the display 51 according to the present embodiment is a head-up display, the display 51 may be a meter display provided in an instrument panel, for example.

Various techniques are conventionally known regarding pedal misapplication operation determination methods, and such techniques may be optionally employed.

A first aspect of the disclosure relates to a driver assistance device. The driver assistance device includes one or more processors. The one or more processors are configured to determine whether a pedal misapplication determination condition is satisfied, and output, when the one or more processors determine that the pedal misapplication determination condition is satisfied, at least one of a warning display and warning audio directly instructing a driver to release a pedal that is depressed at a point in time of outputting.

The one or more processors of the driver assistance device according to the above aspect determine whether a predetermined pedal misapplication determination condition that is satisfied when it is estimated that a pedal misapplication operation has occurred, which is an operation where a driver of a vehicle erroneously depresses an accelerator pedal while intending to depress a brake pedal, is satisfied.

In a case of determining that the pedal misapplication determination condition has been established, the one or more processors of the driver assistance device according to the above aspect perform warning (attraction of attention) as to the driver.

When a pedal misapplication operation has been performed, the pedal misapplication operation needs to be quit as quickly as possible. Accordingly, the one or more processors output at least one of a display and audio as a warning, directly instructing the driver to release the pedal that is depressed at the current point in time.

The driver is directly instructed to release the pedal that is depressed at the current point in time. This "directly" means that there is no implicit guiding of operations of releasing the accelerator pedal included, such as in a form of instructing to depress the brake pedal, for example. Accordingly, the driver can quickly release the pedal that he/she is depressing. At this point, sudden acceleration of the vehicle is suppressed. Also, the driver can more readily recognize, at an early stage, the state that he/she is erroneously depressing the accelerator pedal, through this instruction. Accordingly, the driver can switch from depressing the accelerator pedal to the brake pedal at an early stage.

According to the above configuration, when a pedal misapplication operation has been performed, the driver can be guided to perform an operation to decelerate the vehicle at an early stage.

In the above aspect, the processor may be configured to display, on a display visually recognizable by the driver, an attention-attracting illustration, which is an illustration including an illustration of a foot in a state of depressing a pedal as viewed from a lateral side of the vehicle and an arrow pointing in a direction of distancing the foot away from the pedal, as the warning display.

Using an illustration (picture) that tells the content at a glance, as the form of warning (attracting attention), enables the driver to be made to quickly recognize actions to be taken. Accordingly, in the above configuration, the processor displays, on a display visually recognizable by the driver, an attention-attracting illustration, which is an illustration where an arrow pointing in a direction of distancing a foot from a pedal has been added to an illustration of the foot in a state of depressing the pedal as viewed from a lateral side of the vehicle.

The arrow added to the attention-attracting illustration can cause the driver to intuitively recognize the direction in which the foot should be moved. Accordingly, this attention-attracting illustration is directly expressing an instruction to "release the pedal that you are depressing" to the driver. Accordingly, the driver can quickly release the accelerator pedal that he/she is depressing, guided by this attention-attracting illustration. The driver can also readily recognize that he/she had been erroneously depressing the accelerator pedal, through the instruction by such an illustration. Accordingly, the driver can recognize the current state at an early stage, and perform correct pedal operations.

In the above aspect, the one or more processors may be configured to output, via a speaker, an audio message including words instructing to release the pedal that is depressed at a point in time of outputting, as the warning audio.

According to the above configuration, the driver is instructed to release the pedal currently being depressed, by an audio message output from the speaker. For example, the driver is warned by an audio message such as "release the pedal" or the like. Outputting an audio message from the speaker instructing the driver to depress the brake pedal, for example, makes it difficult for the driver to recognize the current state, since the driver thinks he/she is already depressing the brake pedal. Therefore, the processor causes the speaker to output an audio message instructing the driver to release the pedal being depressed at the current point in time. Accordingly, the driver can quickly release the accelerator pedal, being guided by this audio message. Also, the driver can readily recognize that he/she had been erroneously depressing the accelerator pedal, through the instruction by such an audio message. Thus, the driver can recognize the current state at an early stage, and perform correct pedal operations.

In the above aspect, the one or more processors may be configured to output both of the warning display and the warning audio when the one or more processors determine that the pedal misapplication determination condition is satisfied, display, on a display visually recognizable by the driver, an attention-attracting illustration, which is an illustration including an illustration of a foot in a state of depressing a pedal as viewed from a lateral side of the vehicle and an arrow pointing in a direction of distancing the foot away from the pedal, as the warning display, and output, via a speaker, an audio message including words instructing to release the pedal that is depressed at the point in time of outputting.

According to the above configuration, both display of the attention-attracting illustration to cause intuitive recognition of a pedal releasing operation, and outputting of an audio message instructing release of the pedal, are performed. Accordingly, the driver can be guided to perform correct pedal operations (operations of switching from depressing the accelerator pedal to the brake pedal) in an even more sure manner.

In the above aspect, the one or more processors may be configured to output, via the speaker, an audio message indicating that the accelerator pedal is depressed, before outputting the audio message instructing to release the pedal that is depressed at a point in time of outputting.

According to the above configuration, the driver quickly releases the pedal that he/she is depressing, through the display of the attention-attracting illustration. At this time, the audio message indicating that the accelerator pedal is depressed is output, and accordingly the driver can recognize the current state where he/she has erroneously depressed the accelerator pedal, in an even more sure manner, through both of this audio message and display of the attention-attracting illustration. Also, the audio message transitions from a message to the effect that the accelerator pedal is depressed, to a message instructing releasing of the pedal that is being depressed in the current state. Accordingly, the driver can be guided to perform correct pedal operations (operations of switching from depressing the accelerator pedal to the brake pedal) in an even more sure manner.

In the above aspect, the one or more processors may be configured to, when an operation amount of the accelerator pedal becomes no more than a predetermined threshold value for the first time after the one or more processors output at least one of the warning display and the warning audio, output at least one of a display and audio instructing to perform a brake operation.

In the above aspect, the one or more processors may be configured to, when the one or more processors determine that the pedal misapplication determination condition is satisfied, execute driving force restriction control where driving force of the vehicle is made to be smaller than when the pedal misapplication determination condition is not satisfied, while outputting at least one of the warning display and the warning audio.

In the above aspect, the one or more processors may be configured to, when an operation amount of the accelerator pedal becomes no more than a predetermined threshold value while executing driving force restriction control, output at least one of a display and audio instructing to perform a brake operation.

In the above aspect, the pedal misapplication determination condition may be a condition for estimating whether a pedal misapplication operation has occurred, the pedal misapplication operation being an operation where a driver of a vehicle erroneously depresses an accelerator pedal while intending to depress a brake pedal.

A second aspect of the disclosure relates to a driver assistance method executed by one or more processors. The driver assistance method includes determining whether a pedal misapplication determination condition is satisfied, and outputting, when the processor determines that the pedal misapplication determination condition is satisfied, at least one of a warning display and warning audio directly instructing the driver to release a pedal that is depressed at a point in time of outputting.

What is claimed is:

1. A driver assistance device comprising one or more processors configured to:
   determine whether a pedal misapplication determination condition is satisfied;
   output, via a speaker, when the one or more processors determine that the pedal misapplication determination condition is satisfied, an audio message indicating that an accelerator pedal is depressed;
   output at least one of a warning display and warning audio directly instructing a driver to release a pedal that is depressed at a point in time of outputting,
   when it is determined that the pedal misapplication determination condition is satisfied, execute driving force restriction control while outputting at least one of the warning display and the warning audio, the driving force restriction control being a control of setting a driver-requested driving force corresponding to an operation amount of the accelerator pedal to be smaller than the driving force in operations in which no pedal misapplication is determined; and
   when the operation amount of the accelerator pedal becomes no more than a predetermined threshold value while executing the driving force restriction control, change a form of attraction of attention from a first form of directly instructing to release the accelerator pedal that is depressed to a second form of instructing to perform a brake operation and output at least one of a display and audio instructing the driver to depress a brake pedal.

2. The driver assistance device according to claim 1, wherein the one or more processors are configured to display, on a display visually recognizable by the driver, an attention-attracting illustration, which is an illustration including an illustration of a foot in a state of depressing a pedal as viewed from a lateral side of a vehicle and an arrow pointing in a direction of distancing the foot away from the pedal, as the warning display.

3. The driver assistance device according to claim 1, wherein the one or more processors are configured to output, via the speaker, an audio message including words instructing to release the pedal that is depressed at a point in time of outputting, as the warning audio.

4. The driver assistance device according to claim 1, wherein the one or more processors are configured to:
   output both of the warning display and the warning audio when the one or more processors determine that the pedal misapplication determination condition is satisfied;
   display, on a display visually recognizable by the driver, an attention-attracting illustration, which is an illustration including an illustration of a foot in a state of depressing a pedal as viewed from a lateral side of a vehicle and an arrow pointing in a direction of distancing the foot away from the pedal, as the warning display; and
   output, via the speaker, an audio message including words instructing to release the pedal that is depressed at the point in time of outputting.

5. The driver assistance device according to claim 1, wherein the one or more processors are configured to, when the operation amount of the accelerator pedal becomes no more than the predetermined threshold value for the first time after the one or more processors output at least one of the warning display and the warning audio, output at least one of a display and audio instructing the driver to depress the brake pedal.

6. The driver assistance device according to claim 1, wherein the pedal misapplication determination condition is a condition for estimating whether a pedal misapplication operation has occurred, the pedal misapplication operation being an operation where the driver of a vehicle erroneously depresses the accelerator pedal while intending to depress the brake pedal.

7. A driver assistance method executed by one or more processors, the method comprising:
   determining whether a pedal misapplication determination condition is satisfied;
   outputting, via a speaker, when the one or more processors determine that the pedal misapplication determination condition is satisfied, an audio message indicating that an accelerator pedal is depressed;
   outputting at least one of a warning display and warning audio directly instructing a driver to release a pedal that is depressed at a point in time of outputting;
   when it is determined that the pedal misapplication determination condition is satisfied, executing driving force restriction control while outputting at least one of the warning display and the warning audio, the driving force restriction control being a control of setting a driver-requested driving force corresponding to an operation amount of the accelerator pedal to be smaller than the driving force in operations in which no pedal misapplication is determined; and
   when the operation amount of the accelerator pedal becomes no more than a predetermined threshold value while executing the driving force restriction control, changing a form of attraction of attention from a first form of directly instructing to release the accelerator pedal that is depressed to a second form of instructing to perform a brake operation and outputting at least one of a display and audio instructing the driver to depress a brake pedal.

* * * * *